United States Patent [19]

Grether

[11] 4,306,669
[45] Dec. 22, 1981

[54] LIVESTOCK RATION TRANSPORT AND STORAGE

[76] Inventor: Tobias H. A. Grether, Star Rte., Batte Mountain, Nev. 89820

[21] Appl. No.: 76,914

[22] Filed: Sep. 19, 1979

[51] Int. Cl.³ ............................................ B65D 35/36
[52] U.S. Cl. ................................. 222/105; 222/185; 222/531; 222/481.5; 119/52 R; 414/412; 414/414
[58] Field of Search .............. 222/105, 185, 531, 532, 222/481, 481.5, 129, 173; 211/71; 248/95; 119/52 R, 51 R, 58, 60; 414/412, 414

[56] References Cited

U.S. PATENT DOCUMENTS

| | | | |
|---|---|---|---|
| 2,556,661 | 6/1951 | Rendall et al. | 119/52 R |
| 2,618,409 | 11/1952 | Eisenberger et al. | 222/105 X |
| 2,731,950 | 1/1956 | Davidson | 248/95 X |
| 3,007,608 | 11/1961 | Cox, Jr. | 222/105 |

Primary Examiner—Allen N. Knowles
Attorney, Agent, or Firm—Allan D. Mockabee

[57] ABSTRACT

A livestock ration transport and storage system includes an upright cylindrical body of open wire secured at its bottom on a conventional wooden pallet, a flexible plastic liner sack in the cylindrical body filled with alfalfa pellets or other livestock ration, the upper end of the sack being closed about a ventilation tube, and the plastic liner being capable of being ruptured in the area of one or more of the openings in the lower portion of the wire body to give access to the ration contained in the liner; the filled unit being liftable on the tines of a fork life vehicle to load it on a truck for transportion to a consumer for delivery at that point in place of an empty container.

4 Claims, 12 Drawing Figures

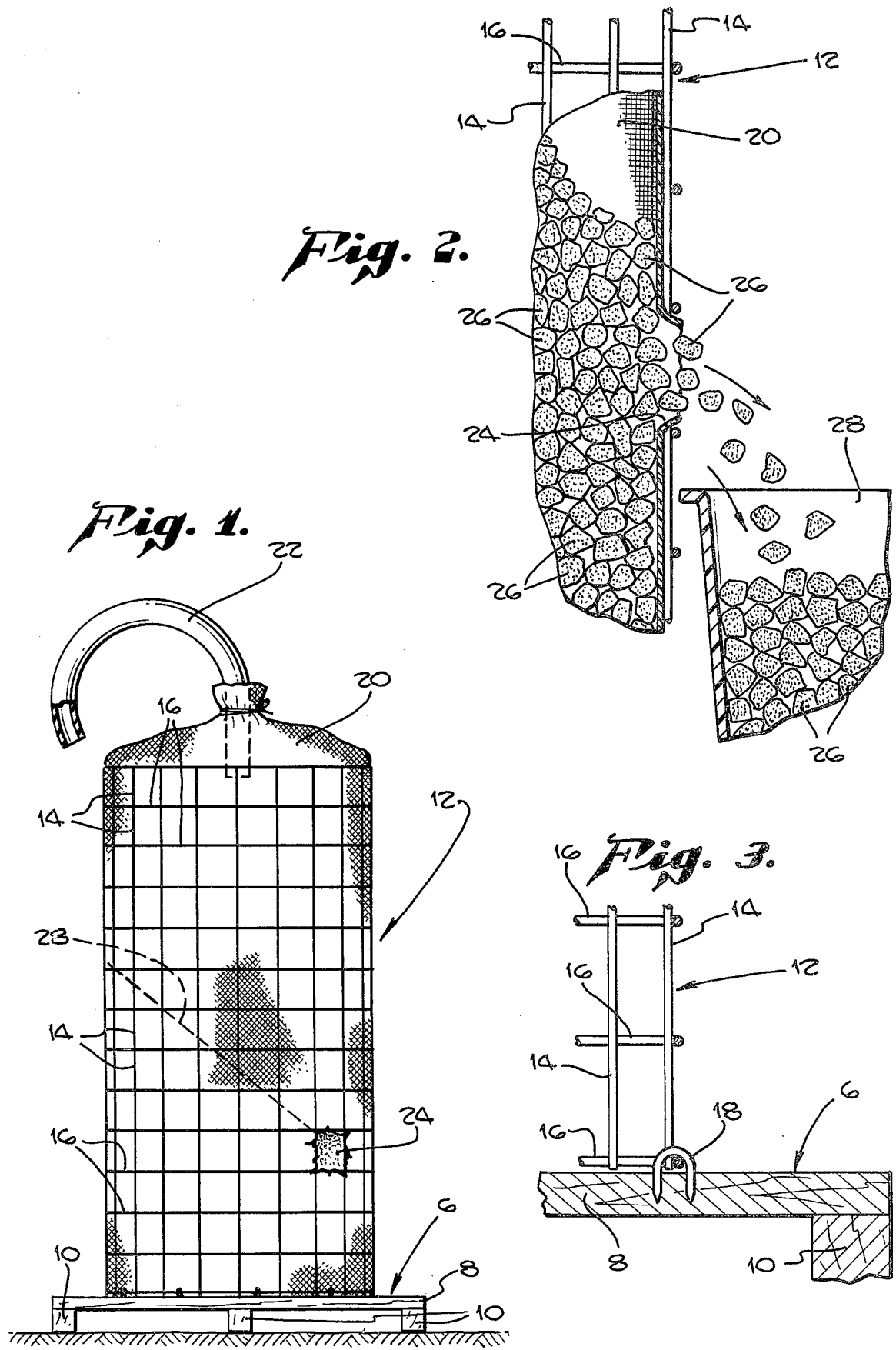

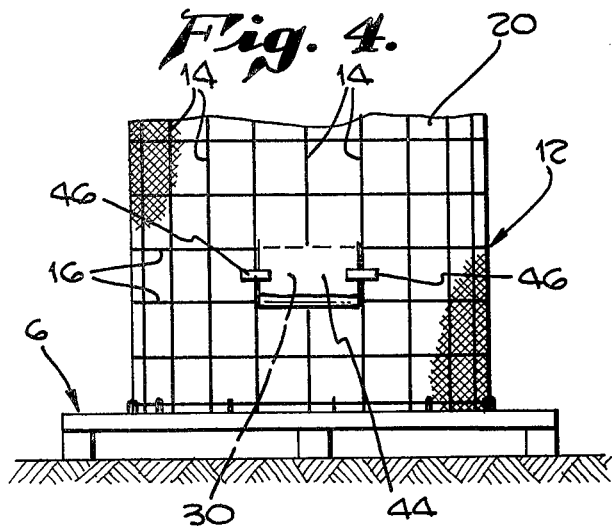
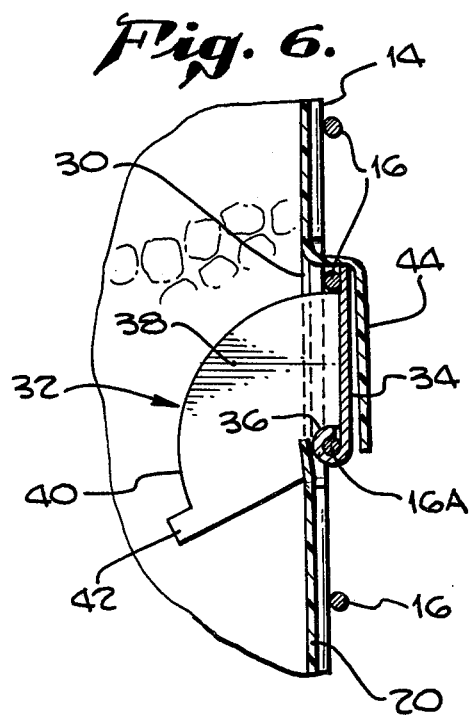
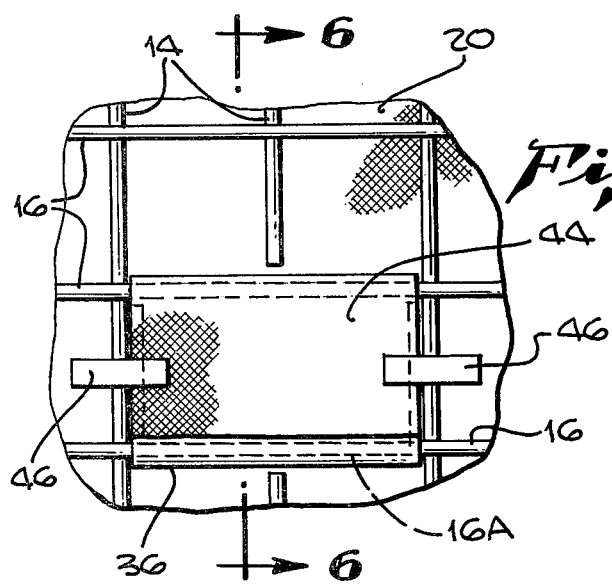
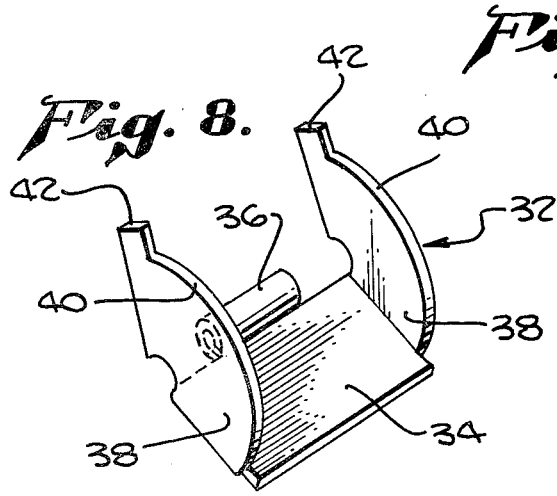
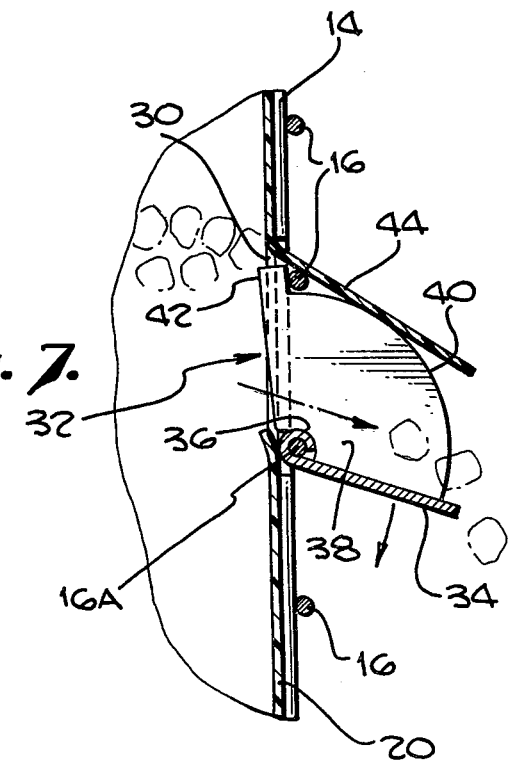

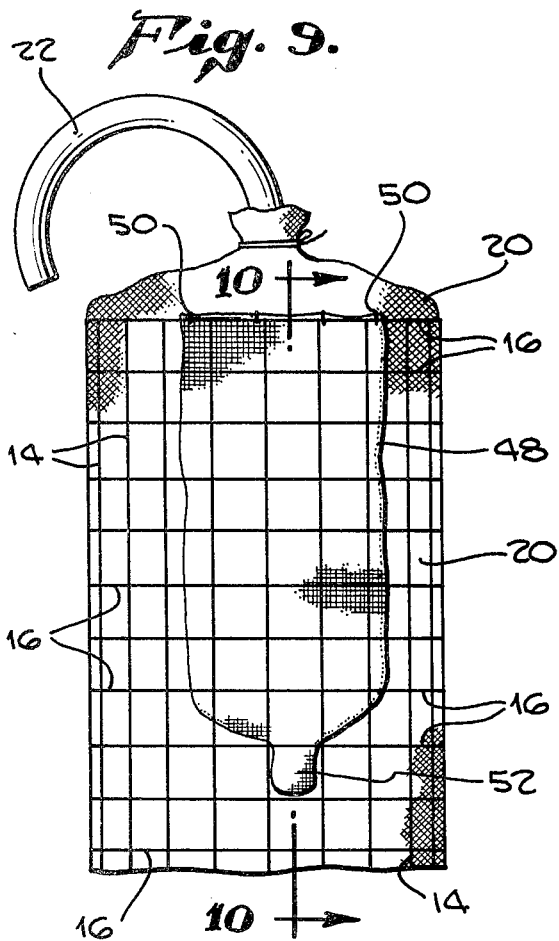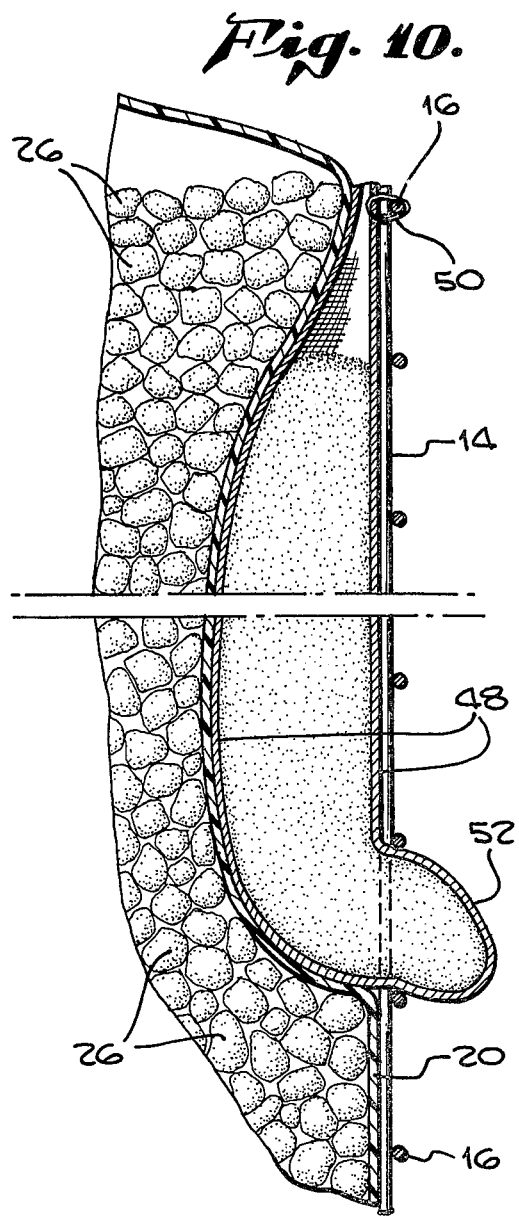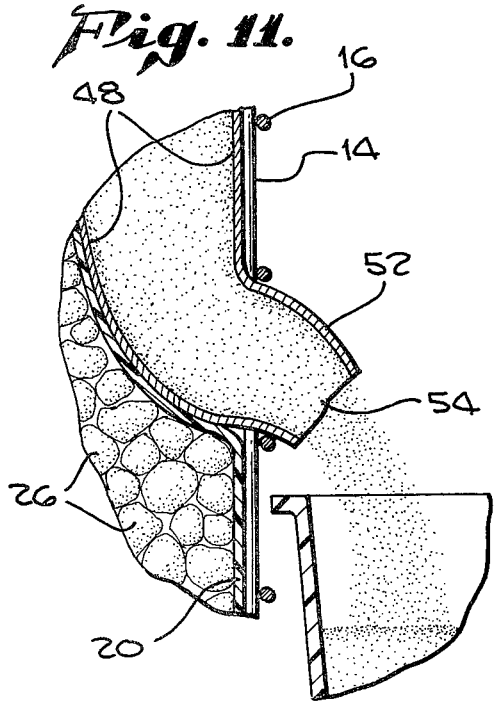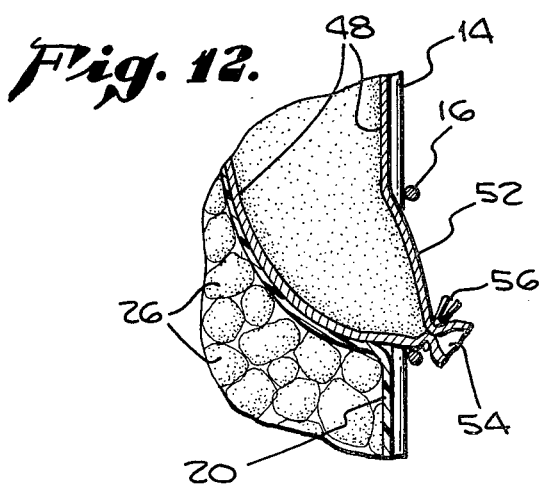

LIVESTOCK RATION TRANSPORT AND STORAGE

FIELD OF THE INVENTION

The invention is in the field of livestock ration bulk packaging, transportation and delivery to a consumer location where the ration is to be dispensed as needed.

Vitamin and mineral fortified alfalfa pressed into pellets has become popular as a horse ration. As with nearly all commodities, they are less expensive when purchased in larger quantities, but many horse owners are unable to purchase in bulk because of lack of storage space or the reluctance or inability to spend the money to erect feed storage facilities. They therefore purchase in quite small quantities at a necessarily higher price.

The present invention is directed to means for economically transporting and storing fairly substantial quantities of livestock ration, particularly alfalfa pellets in lightweight easily movable bulk containers which can be deposited at the location of use of the ration, and which when emptied, can readily be replaced with filled containers, the empty ones being returned for reuse. Means is provided to provide ventilation of the storaged ration to prevent it from becoming overheated and also to inhibit mold. The filled containers can be delivered and held for reasonable lengths of time before and during use, the ration being protected against rain and other undesirable weather conditions.

Additionally, grain packages can be provided optionally in the containers in desired quantities preferably in such ratios to the alfalfa pellets that their consumption would be accomplished simultaneously.

The above and other advantages will more fully appear from the following description in connection with the accompanying drawing.

FIG. 1 is a side elevational view of an embodiment of the invention.

FIG. 2 is an enlarged fragmentary detail of a portion of the side wall of a container with material dispensed therefrom into a feed bucket.

FIG. 3 is an enlarged sectional detail of the means of fastening the side wall to the bottom member.

FIG. 4 is a view of the lower part of a container with a modified form of pellet dispensing opening.

FIG. 5 is an enlarged detail of the dispensing opening of FIG. 4.

FIG. 6 is a sectional detail taken approximately on line 6—6 of FIG. 5, the dispensing means being closed.

FIG. 7 is a view similar to FIG. 6 with the dispensing means in dispensing position.

FIG. 8 is a perspective view of the dispensing spout.

FIG. 9 is a side elevational view of a container with a grain sack suspended inside the wire body.

FIG. 10 is an enlarged sectional detail taken on line 10—10 of FIG. 9, the bottom of the grain sack being closed.

FIG. 11 is a fragmentary sectional view showing the bottom of the grain sack open to permit the grain to be dispensed therefrom.

FIG. 12 is a sectional detail showing the bottom of the grain sack reclosed after use.

The device includes a base 6 comprising a flat preferably wood panel 8 supported by several feet 10 in the manner of a conventional wood pallet upon which various goods are piled for transportation and storage.

Extending upwardly from the base 6 is a cylindrical open wire body 12 composed of laterally spaced vertical wires 16. The lowermost horizontal wires 16 may be secured to the panel 8 of base 7 by suitable means such as staples 18.

By way of illustration and not of limitation, the vertical wires and the horizontal wires may be about six inches apart and a convenient height may be in the neighborhood of six or eight feet.

The open work wire body or cage 12 is open at the top and adapted to receive a large plastic sack 20 whose diameter is approximately that of the wire body and whose height is preferably slightly higher. The liner sack 20 initially has its open upper end held wide and the livestock ration is loaded into the sack by any suitable means such as an endless belt inclined elevator. When the sack 20 is filled, its open upper end is closed about a ventilation tube 22 so that the sack can breathe. Stock rations such as alfalfa, when confined in a quantity in an enclosed area, may tend to become heated and to become moldy. By reason of the fact that the liner sack 20 is flexible and the ventilation hose passage is considerably more restricted than the diameter of the liner sack, air in the liner will expand and contract in response to fluctuations in atmospheric temperatures from day to night and cause the liner to breathe. This is mainly due to the expansion and contraction of the air within the liner but can also in part be due to filling out and contraction of the liner itself within the confines of the wire body 12.

In FIGS. 1 and 2 there is illustrated a portion of the liner body 20 which is cut or broken away as at 24 to provide a dispensing opening for alfalfa pellets 26 which are shown in FIG. 2 falling into a feed bucket 28. Because the pellets might not readily flow from the dispensing opening 24, their discharge can be aided with one's hand or very small stick or other tool. The dispensing opening 24 is shown above the bottom of the composite storage container. As the level of feed drops in the container it may eventually get to a point where its angle of repose may be as indicated by the broken line 28 in FIG. 1. Then another opening can be made on the opposite side near the very bottom of the container. Of course to completely empty the plastic liner sack 20 it can be removed readily from the wire body 12 and completely emptied of its contents.

In FIGS. 4 through 8 there is illustrated another form of alfalfa pellet dispensing opening. The cylindrical wire body 12, adjacent the bottom thereof, has one of its vertical wires 14 cut away between a pair of horizontal circular wires 16 to form a horizontally widened dispensing opening 30 for alfalfa pellets. A porton of one of the horizontal circular wires 16 which defines the bottom of opening 30, is designated 16A. Opening 30 is adapted to receive a dispensing spout 32 having a bottom 34 provided with a tongue 36 bent about the horizontal wire portion 16A to provide a hinge. Spout 32 is provided with sides 38 having curved edges 40 so that the spout will clear the upper portion of opening 30 when it is swung from the position of FIG. 6 to that of FIG. 7. The spout sides 38 are provided with projecting tongues 42 which, as shown in FIG. 7, engage the horizontal wire 16 at the top of opening 30 to hold the spout bottom 34 in an outwardly and downwardly disposed position for dispensing when desired.

The plastic liner sack 20 is cut horizontally and vertically adjacent the bottom and vertical sides of the opening 30 to provide a protective flap 44 which overlies the vertically disposed spout bottom 34 when the latter is swung to the position of FIG. 6. The flat 34 may be provided with separable securing means such as pieces of pressure sensitive tape 46 which can be removed to permit the spout to be swung outwardly to the position of FIG. 7.

FIGS. 9 through 12 illustrate another embodiment of the invention. Many horse owners feed grains to their stock, usually in lesser percentages than those of the alfalfa pellets. Therefore there is provided a grain sack 48, an upper edge portion of which may be rather lightly secured to the uppermost horizontally wire 16, as with stitching or light wire loops 50. It is preferred that the grain sack 48 be filled simultaneously with the filling of the plastic liner 20 with pelletized alfalfa so that the alfalfa will support the grain sack 48 within the wire body 12.

The lower end 52 of the grain sack 48 may be reduced in cross-section or merely gathered together as indicated in the drawing. When removal of the grain from the sack is desired, the lower end 52 can be drawn outwardly between the vertical horizontal wires of the wire body 12 and the end cut as indicated at 54 in FIG. 11 when the desired quantity of grain has been drawn from the sack 48, the cut lower end can be gathered and closed with a suitable tie 56.

The amount of grain to be provided in a sack 48 can be determined by the order of the purchaser, and for the reason the sack can be filled to varying desired amounts. However, as stated above, if the grain sack is filled simultaneously with the plastic liner sack 20, the alfalfa pellets in sack 20 will give support to the grain sack 48 as the two are filled and it is therefore unnecessary to provide a grain sack of great strength or to provide a strong upper tie 16.

The pellet dispensing outlet opening 24 in FIGS. 1 and 2, and the pellet outlet spout 32, of course, would be at a different location than that of the bottom 52 of the grain sack 48. However, if the alfalfa pellet outlet is disposed 180 degrees from the grain sack bottom 52, then the alfalfa pellets, as the plastic liner sack 20 becomes depleted, will remain stacked against the grain sack 48 for a longer period of time than if the alfalfa pellet outlet of the grain sack bottom were located close to each other.

A consumer can purchase and have delivered one or more of the containers of the invention, opening and removing the contents of each one successively as the feed is used. When one or more containers are emptied and a new supply is required, the alfalfa or pellet producer can quickly and easily deliver filled containers and remove empty ones for reuse.

The system is inexpensive to construct and easy to handle, even when loaded, with the fork lift vehicle which may be transported on the back of the motor truck used to carry the containers, in the manner shown in my U.S. Pat. No. 3,799,379.

It should be noted that when the liner sack 20 has been cut to provide a dispensing opening such as opening 24, the heat of the sun can create a degree of air circulation from the dispensing opening upwardly through the feed stuff and that of the ventilator tube 22 by convection, since alfalfa pellets are rather loosely packed and a certain amount of convection ventilation can be secured.

It should of course be understood that various changes can be made in the form, details, arrangement and portions of the various parts without departing from the spirit of the invention.

What is claimed is:

1. A livestock ration transportation and storage system comprising:
   a portable base,
   an upwardly extending self-supporting container mounted upon and secured to said portable base and having a dispensing opening in its lower sidewall,
   said base having means for engagement by a lift mechanism to load it and said container, as a unit, upon a transport vehicle,
   said container having a lightweight flexible liner with a dispensing opening in its lower sidewall registering with the dispensing opening in said self-supporting container,
   a dispensing spout on said self-supporting container and said dispensing opening thereof,
   and a portion of said flexible liner lying over said spout.

2. The structure of claim 1, and said spout being movable to extend it outwardly from said self-supporting container.

3. A livestock ration transportation and storage system comprising:
   a portable base,
   an upwardly extending self-supporting container mounted upon and secured to said portable base and having a dispensing opening in its lower sidewall,
   said base having means for engagement by a lift mechanism to load it and said container, as a unit, upon a transport vehicle,
   said self-supporting container comprising an openwork tubular member,
   a flexible liner in said container having a dispensing station accessible through the dispensing opening of the container,
   and a grain container mounted in said self-supporting container between the latter and said flexible liner and at least partially supported by said liner when the liner is filled.

4. The structure in claim 3, and said self-supporting container having another opening comprising a grain dispensing opening,
   and said grain container having a lower section with an outlet portion located at said grain dispensing opening.

* * * * *